United States Patent
Nakayama

(10) Patent No.: US 8,341,313 B2
(45) Date of Patent: *Dec. 25, 2012

(54) FIFO SERIAL CONTROL DEVICE, SEMICONDICUTOR DEVICE, AND SERIAL DATA TRANSFER METHOD THAT INDICATES INCLUSION OR NON-INCLUSION OF END DATA OF SERIAL DATA

(75) Inventor: Sanchi Nakayama, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,394

(22) Filed: Apr. 27, 2012

(65) Prior Publication Data

US 2012/0215951 A1 Aug. 23, 2012

Related U.S. Application Data

(63) Continuation of application No. 12/766,605, filed on Apr. 23, 2010, now Pat. No. 8,190,793.

(30) Foreign Application Priority Data

Apr. 27, 2009 (JP) .................................. 2009-107349

(51) Int. Cl.
*G06F 13/14* (2006.01)

(52) U.S. Cl. ................ 710/33; 710/53; 710/54; 710/65; 710/52; 710/72

(58) Field of Classification Search .................... None
See application file for complete search history.

(56) References Cited

U.S. PATENT DOCUMENTS

| | | |
|---|---|---|
| 5,454,097 A | 9/1995 | Babin |
| 5,708,852 A | 1/1998 | Aebli et al. |
| 6,118,298 A | 9/2000 | Bauer et al. |
| 6,323,682 B1 | 11/2001 | Bauer et al. |
| 7,515,761 B2 * | 4/2009 | Takakura et al. ............. 382/244 |

OTHER PUBLICATIONS

MPC5553/5554 Microcontroller Reference Manual Rev. 4.0, Freescale Semiconductor, Apr. 2007, pp. 20-48-20-50.

* cited by examiner

*Primary Examiner* — Tammara Peyton
(74) *Attorney, Agent, or Firm* — Foley & Lardner LLP

(57) ABSTRACT

Provided is a serial control device that makes the length of data transferred as one frame variable. The serial control device transfers serial data having an arbitrary length, and uses end information indicating inclusion or non-inclusion of end data of the serial data. The serial control device transfers data having a transfer unit length in the serial data when the end information indicates non-inclusion of the end data, and transfers an untransferred part of the serial data when the end information indicates inclusion of the end data.

9 Claims, 13 Drawing Sheets

FIFO SERIAL CONTROL DEVICE, SEMICONDICUTOR DEVICE, AND SERIAL DATA TRANSFER METHOD THAT INDICATES INCLUSION OR NON-INCLUSION OF END DATA OF SERIAL DATA

INCORPORATION BY REFERENCE

This application is a continuation of U.S. application Ser. No. 12/766,605, filed Apr. 23, 2010, which claims the benefit of priority from Japanese patent application no. 2009-107349, filed on Apr. 27, 2009, the disclosures of which are incorporated herein in their entirety by reference.

BACKGROUND

1. Field of the Invention

The present invention relates to a serial control device such as a clock synchronous serial interface.

2. Description of Related Art

In serial communication, it is necessary to change the length of one frame depending on a device at the other end of communication.

U.S. Pat. No. 5,454,097 (which is referred to hereinafter as the patent document 1), for example, discloses a serial control device including a plurality of serial control blocks. FIG. 12 shows a configuration of the serial control device disclosed in the patent document 1. The serial control device aims to write data with a variable frame bit length into a serial device.

Specifically, in FIG. 12, a cascaded peripheral device (serial control device) 10 includes at least two registers 51, 52 and 53 with different sizes. Input data is consecutively shifted through a shift register 40 simultaneously by a clock signal. Serial output of the shift register 40 is output from a data output terminal 18 of the cascaded peripheral device 10.

A counter 20 increments its state in response to a clock signal. When the counter 20 corresponds to one of the registers 51, 52 and 53 and a data signal becomes disabled, decoders 30, 31, 32, 33 and 35 activates one of load signals in response to the state of the counter 20.

Upon reaching a maximum value corresponding to the size of the shift register 40, In the configuration of FIG. 12, other peripheral devices 60 and 70 are cascaded to the peripheral device 10. If a frame bit length exceeds the size of the shift register 40, data is written to a serial device by using the peripheral devices 60 and 70. After data with the frame bit length is written to a plurality of peripheral devices, data transfer is performed. In this manner, data transfer according to the frame bit length is implemented.

Further, MPC5553/5554 Microcontroller Reference Manual Rev. 4.0, Freescale Semiconductor, 2007 April, pp. 914-916 (20-48-20-50) (which is referred to hereinafter as "PC5553/5554 Microcontroller Reference Manual") discloses a configuration of another serial control device. FIGS. 13 and 14 show the configuration of the serial control device disclosed in MPC5553/5554 Microcontroller Reference Manual. The serial control device permits transfer of a DSI frame. The DSI frame is made up of bits in which a plurality of serially cascaded DSIPs are connected. The connected frames contain 8 to 64 bits.

FIGS. 13 and 14 show the configuration in MPC5554/5553. In MPC5554 (master), SOUT of DSPI_A is connected to SIN of DSPI_B (slave). In MPC5553 (master), SOUT of DSPI _B is connected to SIN of DSPI _C (slave).

In MPC5554, SOUT of DSPI_B (slave) is connected to SIN of DSPI_C (slave) or the like. In MPC5553, SOUT of DSPI_C (slave) is connected to SIN of DSPI_D (slave) or the like.

SOUT of on-chip DSPI slave is connected to SIN of external SPI slave. SOUT of external SPI slave is connected to SIN of DSPI_A master (MPC5554)/DSPI_B (MPC5553).

MPC5554 DSPI_A master and MPC5553 DSPI_B master control the entire transfer. Slave DSIPs start transfer, and uses a trigger output signal MTRIG in order to notify DSPI_A (MPC5554)/DSPI_B master (MPC5553) that a trigger condition has occurred.

MPC5554 DSPI_A master and MPC5553 DSPI_B master start transfer when there are consecutive data rows exist in the on-chip DSPI slave. Further, DSPI masters receive the MTRIG signal. When DSPI slave sends out a ht signal, a trigger signal (MTRIG signal) is sent out from another DSPI slave to the DSPI master.

An MTOCNT field in DSPIx_DSICR sets the number of hits to be transferred. It is necessary that the MTOCNT field corresponds to the sum of all FMSZ fields regarding DSPIx_CTARs that are selected for DSPI master and all DSPI slaves.

In some cases, a serial peripheral device needs to transmit or receive a frame longer than the data bus width of a CPU (Central Processing Unit) with a frame length of 24 bits, 32 bits, 48 bits or the like. Further, in MPC5554 DSPI_A master and MPC5553 DSPI_B master, a framing error can occur when serial data contained in one frame is not transferred (serially communicated) within a given length of time. For example, an error can occur when data transfer of the next bit takes longer than a given length of time after data transfer of the CPU data bus width. In such a case, data transfer of different frame lengths have been implemented by connecting a plurality of serial control devices in a cascaded manner in the configurations disclosed in the patent document 1 and MPC5553/5554 Microcontroller Reference Manual.

One reason is that functions are allocated to the respective terminals included in a package. To be specific, doubled functions such as a serial control device and a timer device are allocated in a single-chip microcomputer, and a QFP (Quad Flat Package) package with a relatively small number of pins such as 64 pins to 176 pins is often used in consideration of easiness of packaging and package costs. A function of another peripheral device is allocated to a terminal different from the one used for an intended peripheral device. Therefore, when adding a serial control device, although it is necessary to allocate a terminal of the serial control device to a terminal different from the one allocated to the first serial control device, another terminal is already allocated to the terminal, thus failing to work out as a set.

SUMMARY

In the patent document 1, data transfer exceeding the CPU data bus width is implemented by using a plurality of peripheral devices 10. In this case, functions are allocated to the respective terminals in a package, and input/output terminals of the peripheral devices 60 and 70 cannot be allocated to terminals different from the terminal allocated to the peripheral device 10.

In the case where a single serial control device is constructed by cascading a plurality of peripheral devices as shown in FIG. 12, when the bit length of one frame is equal to or smaller than the size of the shift register 40, the peripheral devices 60 and 70 are useless. Specifically, the peripheral devices 60 and 70 whose input/output terminals are not connected to the outside are not used at all, which raises a problem that the circuits are useless and the circuit scale is large.

Further, in the case of allocating terminals to be connected to the input/output terminals of the plurality of peripheral devices 60 and 70 in a package, the prerequisite is that the bit length of one frame is longer than the size of the shift register 40 included in one serial control device. Thus, when the bit length of one frame is equal to or shorter than the size of the shift register 40, it cannot be used as a serial control device despite that terminals are reserved for a serial device in the package.

In the configuration of MPC5553/5554 Microcontroller Reference Manual also, because a shift register corresponding to one frame is used, a larger frame of data cannot be transferred in series, and a shift register is useless when performing serial communication of a small frame.

The present inventors have found that it is desirable to make the length of data transferred as one frame variable in a serial control device.

A first exemplary aspect of the present invention is a serial control device that transfers serial data having an arbitrary length, which includes a FIFO control unit and a serial transfer unit. The FIFO control unit stores serial data having a length equal to or shorter than a transfer unit length and end information indicating inclusion or non-inclusion of end data of the serial data in association with each other. The serial transfer unit transfers data having the transfer unit length in the serial data when the end information indicates non-inclusion of the end data, and transfers an untransferred part of the serial data when the end information indicates inclusion of the end data. When transferring serial data, the serial control device detects whether the currently transferred data is the last part of the serial data having an arbitrary length by using the end information. Then, the serial control device repeats transfer of transfer unit data when transferring the serial data with the arbitrary length, and transfers the untransferred part when transferring the last part. It is thereby possible to transfer the arbitrary length of serial data even when storing transfer data in one shift register.

A second exemplary aspect of the present invention is a semiconductor device that incorporates the above-described serial control device.

A third exemplary aspect of the present invention is a serial data transfer method that transfers serial data having an arbitrary length. The serial data transfer method uses end information indicating inclusion or non-inclusion of end data of the serial data. The method transfers data having a transfer unit length in the serial data when the end information indicates non-inclusion of the end data, and transfers an untransferred part of the serial data when the end information indicates inclusion of the end data.

According to the exemplary aspects of the present invention described above, it is possible to vary the length of data transferred as one frame in a serial control device.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
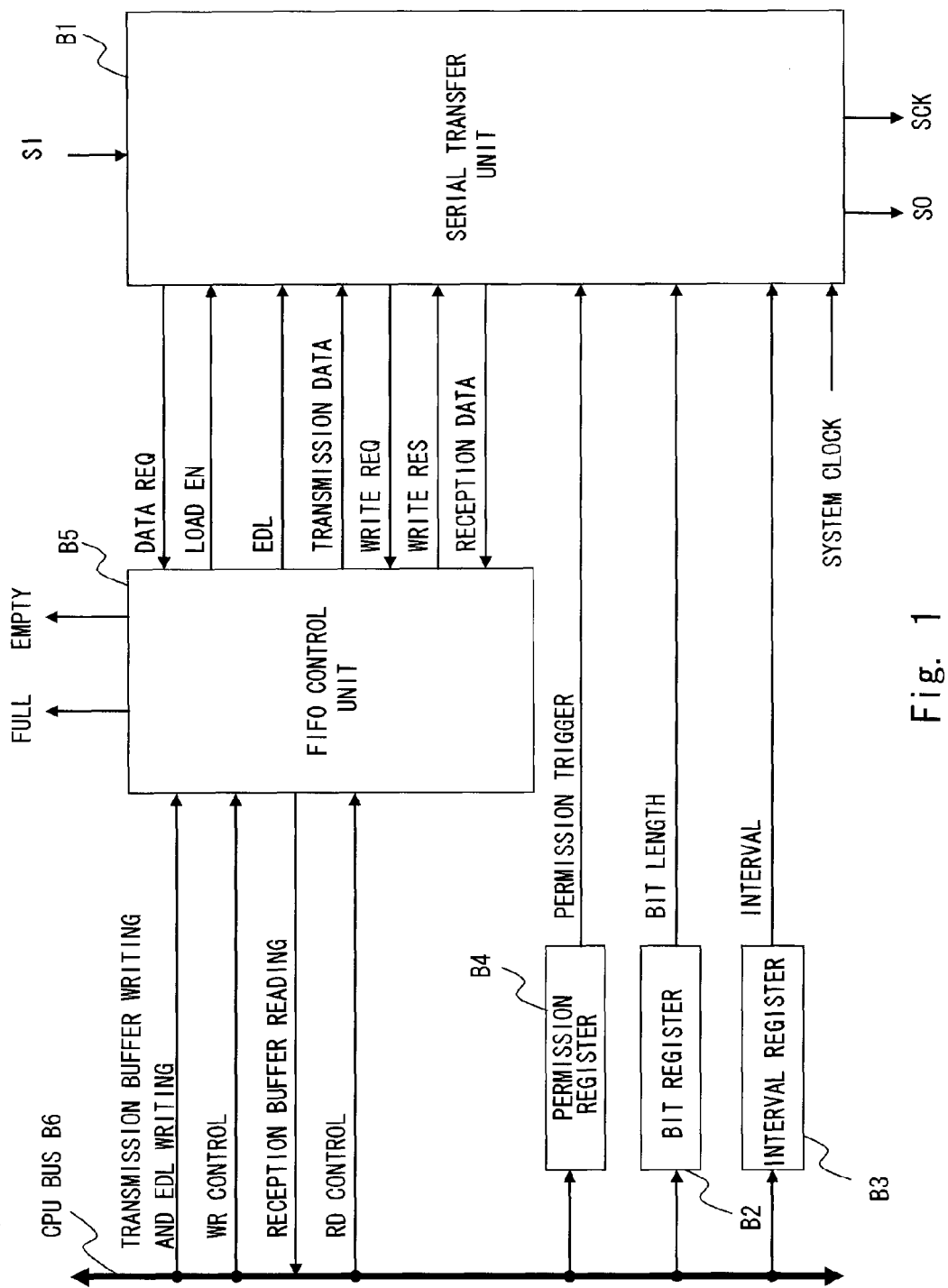
FIG. 1 is a block diagram showing an example of a configuration of a serial control device according to a first exemplary embodiment of the present invention.

Exemplary embodiments of the present invention will be described hereinbelow with reference to the drawings. The following description and the attached drawings are appropriately shortened and simplified to clarify the explanation. In the drawings, the structural elements and equivalents having the identical structure or functions are denoted by the identical reference symbols, and the redundant explanation thereof is omitted.

[First Exemplary Embodiment]

FIG. 1 shows an example of a configuration of a serial control device according to a first exemplary embodiment of the present invention. The serial control device includes a serial transfer unit B1, a bit length setting register (data length setting register) B2, a transfer interval setting register B3, a transmission/reception permission register B4, and a FIFO (First-In First-Out) control unit B5. In FIG. 1, the bit length setting register is shown simply as "BIT REGISTER," the transfer interval setting register is shown simply as "INTERVAL REGISTER," and the transmission/reception permission register is shown simply as "PERMISSION REGISTER." The same applies to other drawings to which reference is made below.

The serial control device is incorporated into a semiconductor device (package) that at least includes a CPU and memory. The serial control device is connected to the CPU through a CPU bus B6. In the serial control device, a program stored in the memory is executed under control of the CPU. Specifically, a program (instructions included in a program) in compliance with a device that uses the serial control device is executed by the CPU through a CPU bus B6. In the following description, the case where the CPU causes the serial control device to execute instructions (write, read etc.) through the CPU bus B6 is sometimes described simply that the CPU executes them.

"Frame" indicates a unit of serial data that is transferred in one time in serial data transfer. The length of a frame is arbitrary, and it is determined by an instruction executed by the CPU according to a device using the serial control device. The serial control device according to the exemplary embodiment of the present invention enables transfer of an arbitrary length of frame of serial data.

"Transfer unit" indicates the length of serial data that is transferred in one time in the serial control device. The transfer unit is determined based on the size (bit width) of a shift register included in the serial control device, and it is typically the size of the shift register. In the description of the exemplary embodiment, word is used as the transfer unit.

The minimum unit of the length may be a unit indicating the length of data, such as bit or word. Bit is used in the description of the exemplary embodiment.

The structural elements of the serial control device are described hereinbelow.

The serial transfer unit B1 serially transmits data that is written to the FIFO control unit B5 by the CPU to the outside, and serially receives data input from the outside, by using the FIFO control unit B5. Further, the serial transfer unit B1 sends out data to the FIFO control unit B5, and directs the CPU to read data from the FIFO control unit B5.

Specifically, when a trigger of a transmission/reception permission signal is generated in the transmission/reception permission register B4, the serial transfer unit B1 performs serial transmission according to transmission data from the FIFO control unit B5, interval information (INTERVAL) held by in the transfer interval setting register B3, and bit length information (BIT LENGTH) held by the bit length setting register B2, and, at the same time, performs serial reception of data from the outside and sends out the received data to the FIFO control unit B5.

In the bit length setting register B2, the length of data is set by the CPU when transferring data different from the transfer unit. The length of data different from the transfer unit is the length of an untransferred part of one frame of serial data which is not yet transferred after data with the length of transfer unit is transferred or after data with the length of transfer unit is transferred a plurality of times. When the length of one frame of serial data is shorter then the transfer unit, the length of one frame of serial data is set in the bit length setting register B2.

Typically, when writing transmission data from the CPU bus B6 to the FIFO control unit B5, only finite values (transfer units) such as 8 bits, 16 bits or 32 bits can be set as the bit length to be written. Therefore, when the serial control device handles serial data with an arbitrary length, it is necessary to set the number of fraction data in one frame of serial data. The bit length setting register B2 holds the number of fraction data. For example, when the size of transmission data that can be written from the CPU to the FIFO control unit B5 in one time is 16 bits, and the frame of serial communication data contains 37 bits, 37−16*2=5, and 5 bits is set to the bit length setting register B2. Data is written to the bit length setting register B2 by the CPU through the CPU bus B6.

In the transfer interval setting register B3, the time interval between frames, i.e., between one frame of serial data and the next frame of serial data to be transferred (the waiting time until starting transfer of the next frame) is set. The reason that the transfer interval needs to be set between frames is to reserve the processing time of a device at the other end of communication which performs serial reception on a communication line. Data is written to the transfer interval setting register B3 by the CPU through the CPU bus B6.

In the transmission/reception permission register B4, a trigger that permits transmission/reception operation is generated. Transmission/reception permission is written to the transmission/reception permission register B4 by the CPU through the CPU bus B6. At the time of starting serial communication, the CPU makes initial setting of the respective control registers such as the transfer interval setting register B3 and the bit length setting register B2, and then enables the transmission/reception permission signal of the transmission/reception permission register B4 and generates a transmission/reception permission trigger (PERMISSION TRIGGER).

The FIFO control unit B5 controls transmission data (transmission FIFO) written by the CPU and reception data (reception FIFO) read by the CPU. The FIFO control unit B5 includes an arbitrary number of sets of a data area for storing serial data with the size of the shift register and an EDL area for storing serial data end word (which is referred to hereinafter as "EDL" as appropriate). The FIFO control unit B5 is described later with reference to FIG. 2. The "serial data end word" is additional information indicating whether end data (end word) is included in serial data stored in the data area. The serial data end word is also referred to as "end information."

With the configuration shown in FIG. 1, the serial control device implements the function of serially transferring one frame of serial data (arbitrary length of serial data). Specifically, based on EDL (end information) indicating inclusion or non-inclusion of end data of serial data, if the EDL indicates non-inclusion of end data, data with the length of the preset transfer unit in the serial data is transferred, and if the EDL indicates inclusion of end data, an untransferred part of the serial data is transferred. The EDL indicates whether serial data in the data area that is stored in the FIFO control unit B5 includes end data or not. With use of the EDL, the serial transfer unit B1 can detect that the serial data to be transferred is the last part of serial data that is contained in one frame, and the next serial data to be transferred is contained in a different frame. Further, the serial transfer unit B1 can detect that the serial data to be transferred is the middle part of one frame, and the next serial data to be transferred is data in the same frame.

Figure 2:
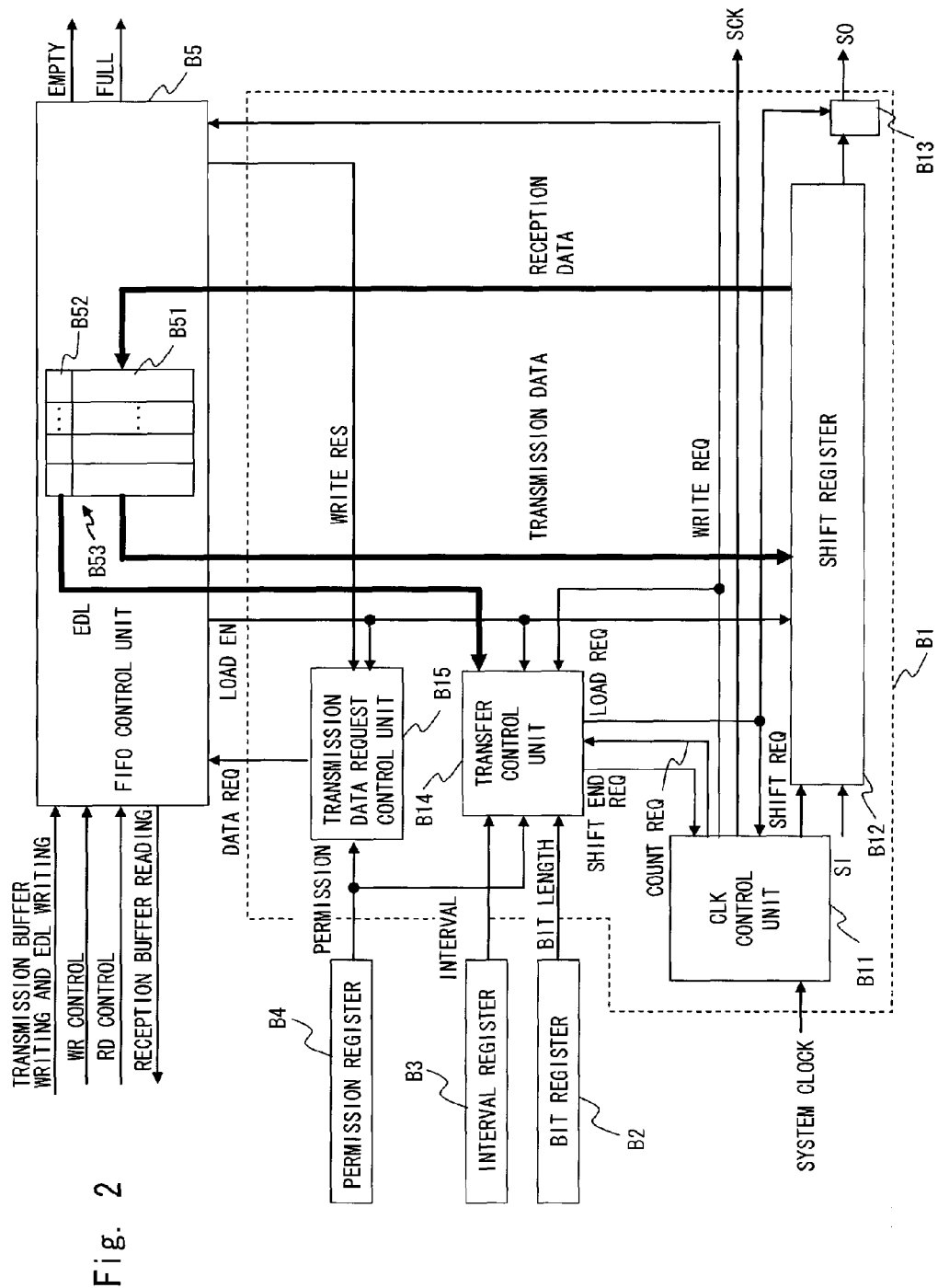
FIG. 2 is a block diagram showing an example of a configuration of a serial transfer unit and a FIFO control unit according to the first exemplary embodiment.

FIG. 2 shows an example of a detailed configuration of the serial transfer unit B1 and the FIFO control unit B5. The serial transfer unit B1 includes a clock control unit (CLK control unit) B11, a shift register B12, and an SO (Slave Out) output register B13, a transfer control unit B14, and a transmission data request control unit B15. The FIFO control unit B5 includes a FIFO buffer B53 having a set of a data area B51 and an EDL area B52.

In FIG. 2, the case where one frame is 13 bits in length is described by way of illustration. When the CPU writes transmission data to the FIFO control unit B5, it also writes EDL, which is additional information of data to be serially transmitted, to the FIFO control unit B5.

The writing of transmission data from the CPU to the FIFO control unit B5 may be started before giving permission to the transmission/reception permission register B4 or after giving permission to the transmission/reception permission register B4. However, if it is after permission to the transmission/reception permission register B4, the operation starts from a transmission empty state. In this example, the case where the operation starts from the state where transmission data is written to the FIFO control unit B5 before permission to the transmission/reception permission register B4 is described.

The FIFO control unit B5 is described firstly. The case where the FIFO buffer B53 includes 8 bits of the data area B51 and 1 bits of the EDL area B52 is described by way of illustration. Thus, the FIFO buffer B53 includes an arbitrary number of 9-bit areas. In FIG. 2, the FIFO buffer B53 is shown without separating a transmission FIFO that stores transmission data from a reception FIFO that stores reception data; however, the transmission FIFO and the reception FIFO may be placed separately. Alternatively, reception data that is received in the same serial communication may be written to an area from which transmission data is sent out. Hereinafter, an area that stores transmission data is referred to as a transmission FIFO and an area that stores reception data is referred to as a reception FIFO for simplifying the description, although not limited thereto.

The data area B51 stores serial data to be transferred. The data area B51 has the size equal to the size of the shift register B12 or at least has the size of the shift register B12.

The EDL area B52 stores EDL. The EDL is additional information that indicates whether end data is included in the serial data stored in the data area, in one frame of serial data being transferred, as described above. When valid (H) is written as EDL to the EDL area B52, it indicates that the serial data written to the corresponding data area B51 includes end data. On the other hand, when invalid (L) is written as EDL to the EDL area B52, it indicates that the serial data written to the corresponding data area B51 does not include end data. Namely, serial data subsequent to the serial data stored in the relevant data area B51 exists, which needs to be transferred as one frame of serial data.

The serial transfer unit B1 is described next.

The CLK control unit B11 generates a serial clock (SCK) for communication by using a system clock divider, a baud rate register or the like. When the CLK control unit B11 receives a transmission output FF load request (LOAD REQ) from the transfer control unit B14, the CLK control unit B11 generates a shift request (SHIFT REQ) in synchronization with the serial clock (SCK) for communication. In timing charts (FIGS. 4, 5, 7 to 9) described later, one cycle of the serial clock SCK corresponds to eight clock cycles of the system clock.

Further, when the CLK control unit B11 receives a shift end request (SHIFT END REQ) from the transfer control unit B14, the CLK control unit B11 recognizes that transmission/reception of data (one word or bit information of the bit length setting register) ends, and outputs a reception FIFO write request (WRITE REQ) (serial transfer end) to the FIFO control unit B5.

The CLK control unit B11 sends out a transmission count request (COUNT REQ) to the transfer control unit B14 based on the serial clock cycle for communication.

When the shift register B12 receives a load EN signal from the FIFO control unit B5, the shift register B12 loads the transmission data from the data area B51 of the FIFO buffer B53. The shift register B12 shifts the data stored in the shift register B12 itself according to the shift request generated by the CLK control unit B11 after the transmission output FF load request is made, and further receives new data from a SI (Slave In) terminal.

When the reception FIFO write request from the CLK control unit B11 is generated and the timing that enables data reading of the FIFO control unit B5 is reached, the valid contents of the shift register B12 are entirely loaded to the data area B51 of the FIFO buffer B53 at the timing of a reception FIFO write response (WRITE RES).

When the SO output register B13 receives the transmission output FF load request from the transfer control unit B14, the SO output register B13 loads the transmission data stored in the shift register B12 and outputs serial data to the SO. The shift request to the shift register B12 and the loading from the shift register B12 in response to the transmission output FF load request are sequentially performed in an alternate manner until transmission/reception of transmission/reception data is performed for the number of bits of the shift register B12.

The transfer control unit B14 sends out the transmission output FF load request each time sending out serial data bits (each time loading the transmission data from the FIFO control unit B5 to the shift register B12). Further, the transfer control unit B14 sends out the shift end request indicating that transmission data (one word or bit information of the bit length setting register) ends. The transmission output FF load request is output in synchronization with the serial clock. The shift end request is output in synchronization with the serial clock at the final bit of transmission data. Further, the transfer control unit B14 includes a shift counter and performs the count operation using the transfer unit (the size of the shift register) or a value set to the bit length setting register B2. The transfer control unit B14 detects the bit length and the final bit of transmission data by using the value of the shift counter.

The transfer control unit B14 checks EDL corresponding to the currently transferred transmission data according to the state of the load EN signal and sends out the transmission output FF load request based on whether the EDL is valid or invalid. Specifically, when the EDL is invalid, the transfer control unit B14 immediately sends out the transmission output FF load request signal so as to start transmission. This is implemented in the first transfer of serial communication. On the other hand, when the EDL is valid, the transfer control unit B14 performs counting for the serial data transfer interval time according to the set value which is set to the transfer interval setting register B3, and sends out the transmission output FF load request after the transfer interval time has elapsed.

When the EDL is invalid, serial data is sent out to the communication line as a series of consecutive serial data in one frame. On the other hand, when the EDL is valid, it is the boundary between one frame and another frame. Thus, sending of serial data to the communication line is not performed for the time period of transfer interval information set to the transfer interval setting register B3. It is thereby possible to reserve the minimum time necessary for processing the previous frame in a receiving device on the communication line.

The transfer control unit B14 receives the reception FIFO write request (serial transfer end) in this exemplary embodiment. However, in a clock synchronous serial interface called CSI (Clocked Serial Interface), SPI or the like, because output is made in synchronization with a serial clock, it is possible to recognize when the reception FIFO write request (serial transfer end) is generated based on the shift end request timing and the serial clock. After receiving the reception FIFO write request (serial transfer end), the transfer control unit B14 starts counting of the serial data transfer interval and refrains from sending out the transmission output FF load request until reaching the predetermined count even when the load EN signal of the next transmission data (word) request becomes enabled in a period shorter than the predetermined transfer interval.

The transfer control unit B14 sends out the transmission output FF load request and the shift end request as follows according to the EDL.

(1) When the EDL is invalid, the transfer control unit B14 sends out the transmission output FF load request for the number corresponding to the bit width of the shift register B12 in synchronization with the serial clock. When the count of the number corresponding to the bit width of the shift register B12 ends, the transfer control unit B14 sends out the transmission output FF load request corresponding to the final bit and also sends out the shift end request.

(2) When the EDL is valid, the transfer control unit B14 sends out the transmission output FF load request for the number corresponding to the bit length information set to the bit length setting register B2 in synchronization with the serial clock. The transfer control unit B14 sends out the shift end request when making the transmission output FF load request corresponding to the final bit of the number of the bit length information.

When the transfer control unit B14 receives the transmission count request from the CLK control unit B11, the transfer control unit B14 makes the transmission output FF load request in units of bits. The sending interval of the transmission output FF load request is thereby in synchronization with the serial clock.

In the first transfer of serial communication, when the transmission data request control unit B15 receives a transmission/reception permission signal (PERMISSION) from the transmission/reception permission register B4, the transmission data request control unit B15 enables a transmission data request signal (DATA REQ) to the FIFO control unit B5 and thereby makes a transmission request of transmission data (one word) to the FIFO control unit B5.

In the transfer of the second and subsequent words of serial communication (transfer of the second and subsequent transfer units in one frame of serial data), when the reception FIFO write response indicating the end of writing of the previous reception data to the FIFO control unit B5 is in a response state, the transmission data request control unit B15 makes a transmission request of transmission data to the FIFO. The response state of the reception FIFO write response is when the reception FIFO write response is transmitted from the FIFO control unit B5 to the transmission data request control unit B15.

The configuration of the serial transfer unit B1 and the FIFO control unit B5 shown in FIG. 2 is described above, and additional description is given hereinbelow regarding a specific operation. In the example of FIG. 2, when the FIFO control unit B5 sends out the load EN, the transmission data request control unit B15 recognizes that the transmission data request to the FIFO control unit B5 is received and sets the transmission data request back to the invalid state.

Although the waiting state for the transmission data request is made by the handshake of the transmission data request and the load EN in the example of FIG. 2, the FIFO control unit B5 may perform waiting for the transmission data request by using a pulse-shaped signal as the transmission data request.

In the configuration of the serial control device shown in FIG. 2, an operation in response to the transmission data request is performed in the following procedure. In response to the transmission data request, when the valid transmission data exists in the FIFO buffer B53, the FIFO control unit B5 sends out the transmission data to the shift register B12, sends out the EDL to the transfer control unit B14, and enables the load EN signal indicating that it is valid data. On the other hand, in response to the transmission data request, when the valid transmission data does not exist in the FIFO buffer B53, the FIFO control unit B5 waits until transmission data and EDL are written to the FIFO buffer B53 by the CPU, and enables the load EN signal at the time when the valid data is prepared.

Further, an operation in response to the reception FIFO write request is performed in the following procedure. At the timing when the valid reception data is accumulated in the shift register B12, the CLK control unit B11 sends out the reception FIFO write request (serial transfer end) to the FIFO control unit B5. When the FIFO buffer B53 is not in the full state and there is a space for writing the contents of the shift register in the FIFO buffer B53, the FIFO control unit B5 loads the valid contents of the shift register B12 to the FIFO buffer B53 and sends out the reception FIFO write response to the transmission data request control unit B15. The FIFO control unit B5 sends out the reception FIFO write response and thereby prompts the transmission data request control unit B15 to load the next transmission data to the shift register B12. When the transmission data request control unit B15 sends out the transmission data request to the FIFO control unit B5, the FIFO control unit B5 can load the transmission data to be serially transferred next to the shift register B12.

Further, when the EDL is valid, the transfer control unit B14 recognizes that it is in between inconsecutive serial data, i.e., at the boundary between frames, and sets the count value for enabling the transfer interval information held by the transfer interval setting register B3.

Further, when the EDL is valid, the transfer control unit B14 enables the bit length information held by the bit length setting register B2 and sends out the transmission output FF load request and the shift end request according to the bit length information. The bit length setting register B2 has a set value which is equal to or smaller than the write unit of the CPU peripheral bus (the bit width of the shift register). At the time of writing the last data on the communication line, the bit length information held by the bit length setting register B2 becomes valid when the EDL is valid. On the other hand, when the EDL is invalid, the maximum value (e.g. 16 bits in length) of the write unit of the CPU peripheral bus becomes valid. One frame length of communication is the EDL valid period (e.g. 16 bits)×n+the total of bit length information, and communication can be performed continuously during the period. When the EDL is invalid, the length of the transfer unit (one word) is set in the bit length setting register B2. However, when the EDL is invalid, the transfer control unit B14 may use the transfer unit without referring to the bit length setting register B2. In this case, a length used when the EDL is valid or an indefinite value is set in the bit length setting register B2.

Figure 3:
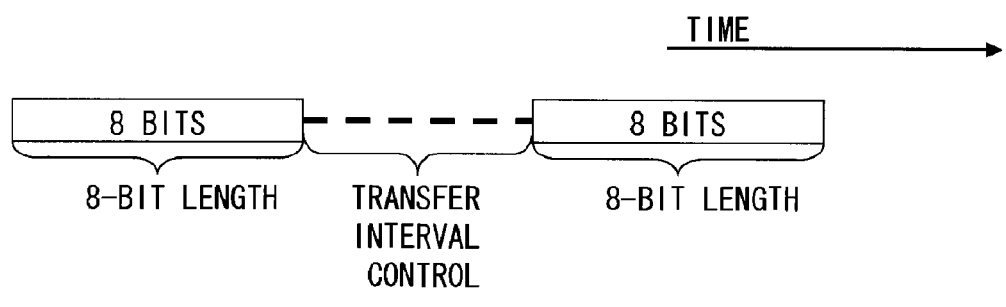
FIG. 3 is a view showing an example of serial transfer of a fixed number of bits.
Figure 4:
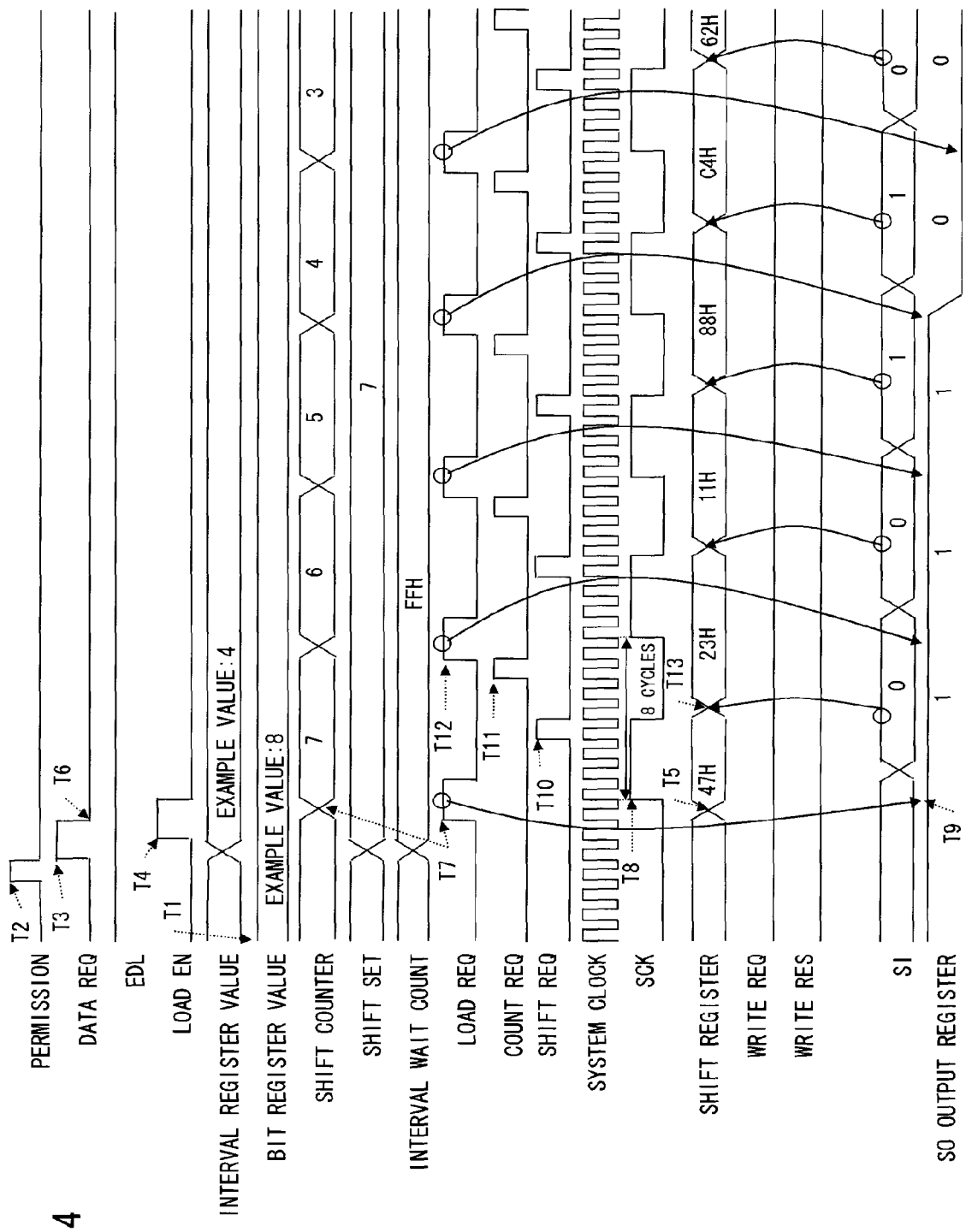
FIG. 4 is a timing chart (1/2) showing a process flow of serial transfer in the case of FIG. 3.
Figure 5:
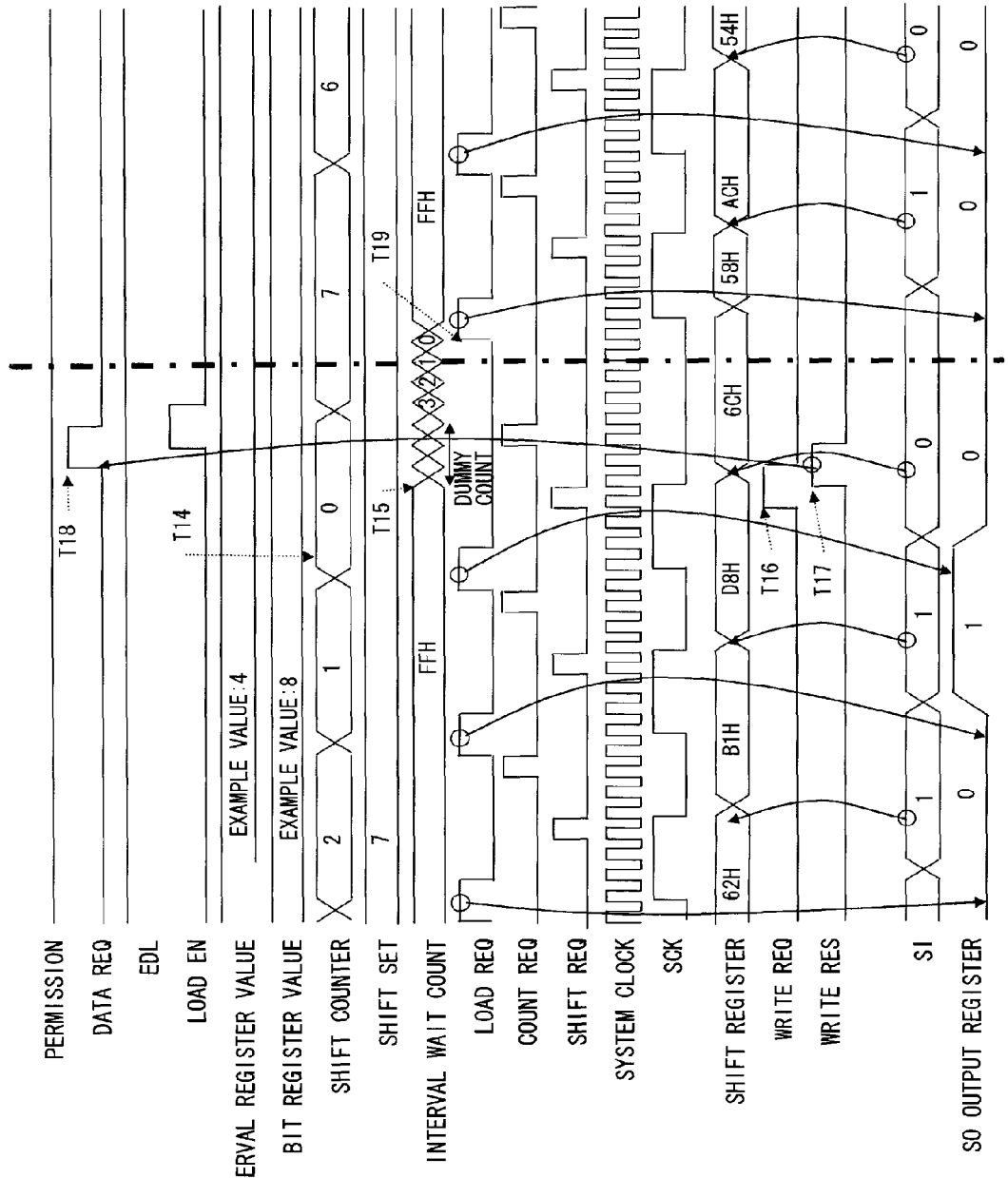
FIG. 5 is a timing chart (2/2) showing a process flow of serial transfer in the case of FIG. 3.

An operation of the serial control device is described hereinafter with reference to FIGS. 3 to 5. First, the case of consecutively transferring serial data in which each frame contains 8 bits as shown in FIG. 3 is described. The serial data transfer shown in FIG. 3 is to describe the case of performing the same operation as related art. It is assumed that the communication speed is fixed, and serial data is 8 bits in length in LSB Fast. The case where transmission data is 47 H (8 bits) and 08 H (8 bits), and reception data is 6 CH (8 bits) and 0 DH (8 bits) is described by way of illustration. In the following description, given timing is indicated by using the symbol Tx (x is an integer satisfying x>0) shown in the timing charts of FIGS. 4 and 5. In FIGS. 4 and 5, value indicated in the shift register, such as "47H" and "23H" are illustrative examples to facilitate the description.

At T1, when starting serial communication, the CPU sets the interval information to the transfer interval setting register B3 and sets the bit length information to the bit length setting register B2, through the CPU bus B6. The transfer control unit B14 stores the interval information held by the transfer interval setting register B3 and the bit length information held by the bit length setting register B2 into its own device and makes initial setting.

At T2, after the processing of T1, the CPU enables the transmission/reception permission signal of the transmission/reception permission register B4 through the CPU bus B6 and makes a serial transfer start request to the transmission data request control unit B15.

At T3, when the transmission/reception permission signal is sent out from the transmission/reception permission register B4, the transmission data request control unit B15 makes a transmission data request to the FIFO control unit B5. Specifically, in the first transfer of serial communication, when the transmission data request control unit B15 receives the transmission/reception permission signal from the transmission/reception permission register B4, the transmission data request control unit B15 enables the transmission data request signal to be sent to the FIFO control unit B5. The transmission data request is basically made with respect to each write unit (transfer unit) to the shift register.

At T4, when the FIFO control unit B5 receives the transmission data request, it determines whether valid transmission data exists in the FIFO buffer B53 (transmission FIFO) in the FIFO control unit B5, or valid data is not delivered from the CPU to the FIFO control unit B5 and it is in the empty state. As a result of determination, if valid transmission data does not exist, sending of the load EN is postponed, and if valid transmission data exists, the load EN, together with the EDL and the transmission FIFO information, are sent out to the transmission data request control unit B15, the transfer control unit B14 and the shift register B12.

At T5, when the shift register B12 receives the load EN signal from the FIFO control unit B5, the shift register B12 loads and sets the transmission data from the data area B51. At this time, when the EDL is invalid, the transmission data corresponding to the bit width of the shift register B12 is stored in the data area B51. On the other hand, when the EDL is valid, the transmission data corresponding to the number of bits set to the bit length setting register B2 is stored in the data area B51. At the timing of T5 in FIG. 4, the EDL is valid, and eight bits are set to the bit length setting register B2. In the example of FIG. 4, "47H" is set as 8-bit serial data to the shift register B12.

At T6, when the transmission data request control unit B15 receives the load EN from the FIFO control unit B5, the transmission data request control unit B15 determines that the FIFO control unit B5 has accepted the transmission data request and disables (inactivates) the transmission data request. In this exemplary embodiment, the transmission data transfer request is controlled by the handshake of the transmission data request and the load EN.

At T7, when the transfer control unit B14 receives the load EN from the FIFO control unit B5, the transfer control unit B14 sends out the transmission output FF load request. Further, the transfer control unit B14 starts the count operation of the shift counter based on the information initially set to the bit length setting register B2. The transfer control unit B14 sets the number of bits of the shift register B12 to the shift counter when the EDL is invalid, and sets the bit information of the bit length setting register B2 to the shift counter when the EDL is valid, and thereby performs the count operation (count down in this case).

At T8, when the CLK control unit B11 receives the transmission output FF load request from the transfer control unit B14, the CLK control unit B11 sets a source clock based on the system clock, a baud rate or a frequency-divided clock to a frequency desirable for communication and starts output of the serial clock SCK.

At T9, when the SO output register B13 receives the transmission output FF load request from the transfer control unit B14, the SO output register B13 loads the transmission data from the bit position for starting the first communication of the shift register B12 and performs output of SO.

At T10, the CLK control unit B11 sends out the shift request to the shift register B12 after half the period of the serial clock SCK (in synchronization with the rising edge in this exemplary embodiment).

At T11, the CLK control unit B11 sends out a transmission count request at the timing corresponding to one period of the serial clock SCK.

At T12, the transfer control unit B14 receives the transmission count request from the CLK control unit B11 and outputs the transmission output FF load request of the next bit.

At T13, when the shift register B12 receives the shift request from the transfer control unit B14, it performs the shift operation and receives the first reception data from the SI terminal.

Then, the operation from T7 to T13 is repeated for a predetermined number of bits (T14). The predetermined number of bits indicates the number of bits (shift register length) of the shift register B12 when the EDL is invalid, and indicates the number of bits set to the bit length setting register B2 when the EDL is valid. The number of bits set to the bit length setting register B2 is the same as the bit length of the shift register or a shorter value than the number of bits of the shift register B12. The case of transferring the last part of a frame corresponds to the case where the EDL is valid. In FIGS. 4 and 5, the case where the number of bits of one frame is the same as the number of bits of the shift register B12 is described. It is thus an example of the operation when the number of hits of the shift register B12 is set to the bit length setting register B2.

By repeating the operation from T7 to T13 for the predetermined number of bits, the transmission data with the predetermined number of bits is output from the SO output register B13 to the SO, and the reception data with the same number of bits as the transmission data is stored from the SI to the shift register B12. When the count value of the shift counter reaches zero, the transfer control unit B14 detects that the transmission data with the predetermined number of bits has been transmitted and the reception data has been received.

At T15, when the count value of the shift counter reaches zero, the transfer control unit B14 starts the count operation to wait for the serial transfer interval. In the serial transfer interval waiting count operation, the transfer control unit B14 adjusts timing by dummy count and then sets the transfer interval by using the interval information set to the transfer interval setting register B3. At this time, the transfer control unit B14 sends out the shift end request to the CLK control unit B11.

At T16, when the CLK control unit B11 receives the shift end request from the transfer control unit B14, the CLK control unit B11 sends out the reception FIFO write request to the FIFO control unit B5.

At T17, if the FIFO buffer B53 is not in a full state but in a data receivable state, the FIFO control unit B5 sends out the reception FIFO write response to the transmission data request control unit B15. At this time, the reception FIFO write request is adjusted to wait for timing in such a way that the reception FIFO write timing is after the timing of the falling edge of the serial clock SCK in consideration of the specification about loading of data to the shift register B12. Therefore, the transmission FF load request is sent out after the transfer interval period has elapsed from reception of the load EN from the FIFO control unit B5 (T19, which is described later).

At T18, when the transmission data request control unit B15 receives the reception FIFO write response from the FIFO control unit B5, the transmission data request control unit B15 enables the transmission data request signal to the FIFO control unit B5. This enables repetition of the operation after T1.

At T19, in the transfer of the next data (frame) corresponding to the size of the shift register, when both of the serial transfer interval waiting count and the first load EN are prepared, the transmission FF load request for the next data (frame) corresponding to the size of the shift register is made. The dash-dotted line in FIG. 5 indicates the start of the serial transfer of the next frame. After that, the operation from T1 to T19 is repeated, and the serial transfer of the next frame is continuously executed.

Figure 6:
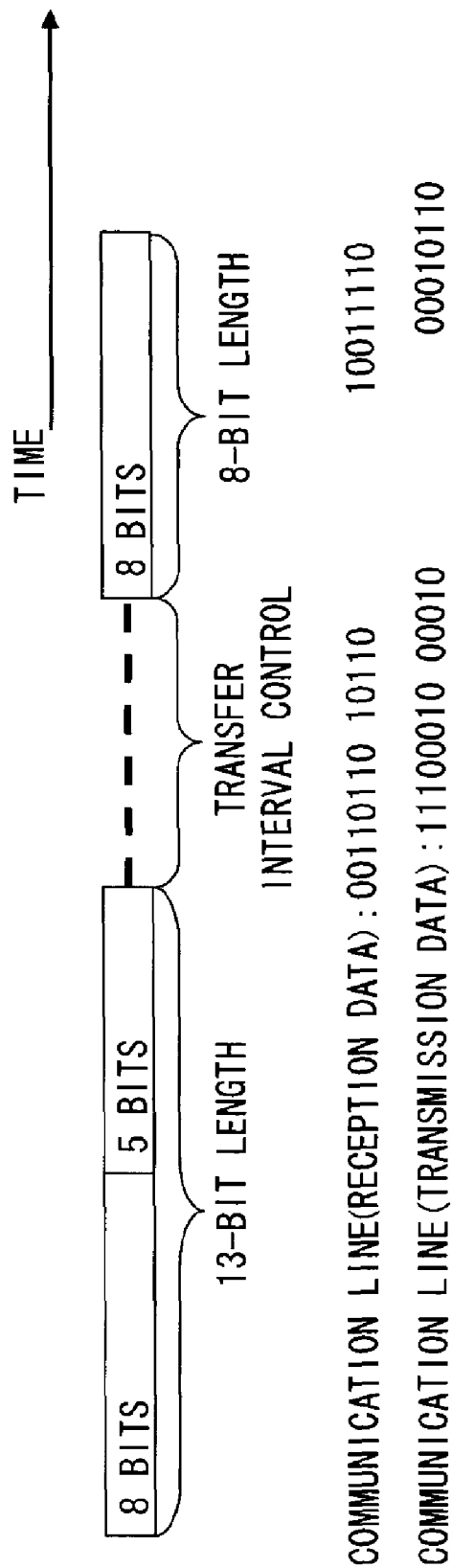
FIG. 6 is a view showing an example of serial transfer of an arbitrary number of bits.

Next, another operation of the serial control device is described hereinafter with reference to FIGS. 6 to 9. The case of consecutively transferring serial data in which one frame contains 13 bits and another frame contains 8 bits shown in FIG. 6 is described. In this exemplary embodiment, in the serial data with 13 bits in one frame, 5-bit serial data is transferred in succession to the first 8-bit serial data with no transfer interval therebetween, by using the EDL. It is assumed that the communication speed is fixed, and serial data is 13 bits in length in LSB Fast. The case where transmission data is 47 H (8 bits), 08 H (5 bits) and 68 H (8 bits), and reception data is 6 CH (8bits), 0 DH (5 bits) and 79 H (8 bits) is described by way of illustration. The same operation as in FIGS. 4 and 5 is not redundantly described, and a different point is mainly described below. In the following description, given timing is indicated by using the symbol Tx (x is an integer satisfying x>0) shown in the timing charts of FIGS. 7 to 9.

Figure 7:
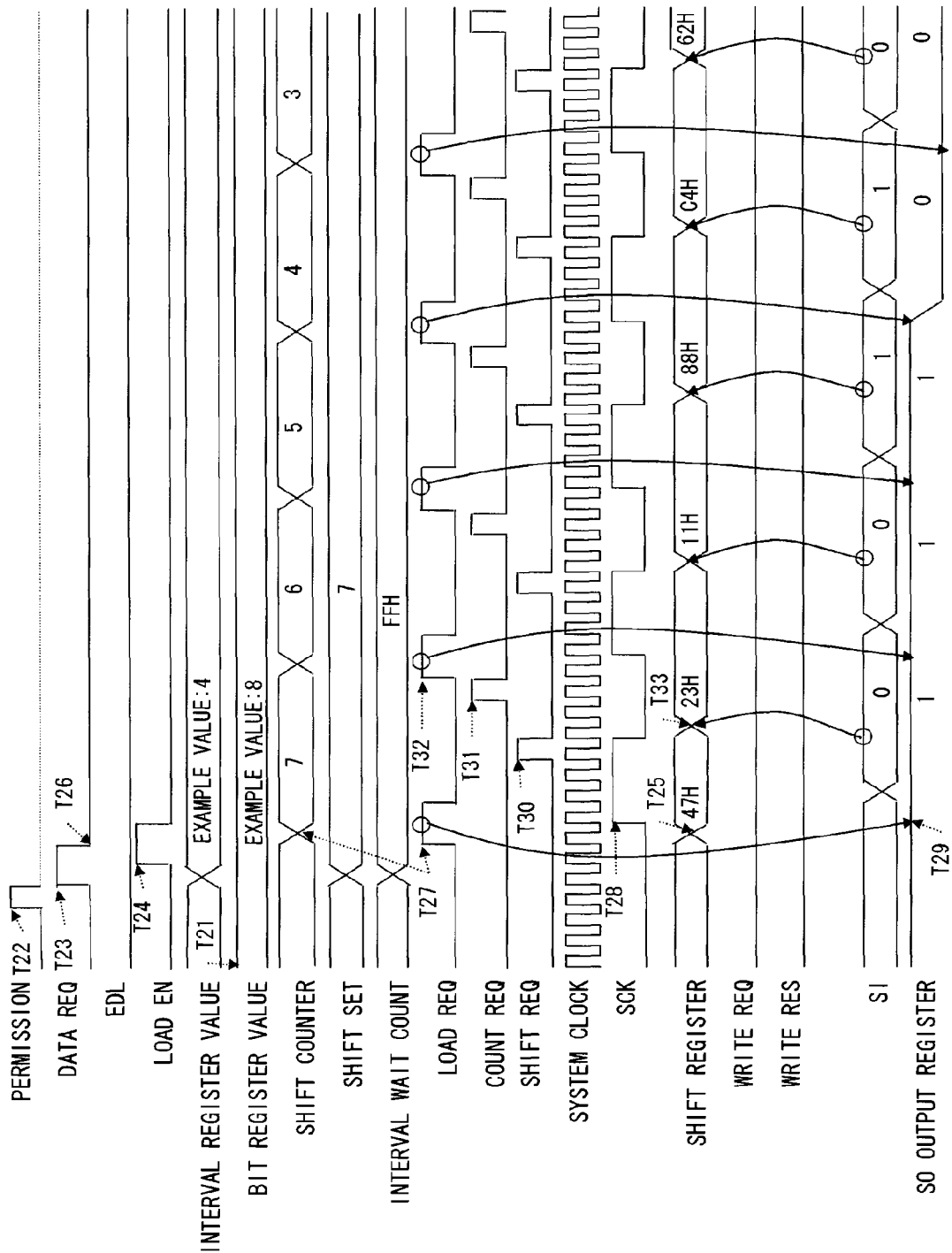
FIG. 7 is a timing chart (1/3) showing a process flow of serial transfer in the case of FIG. 6.
Figure 8:
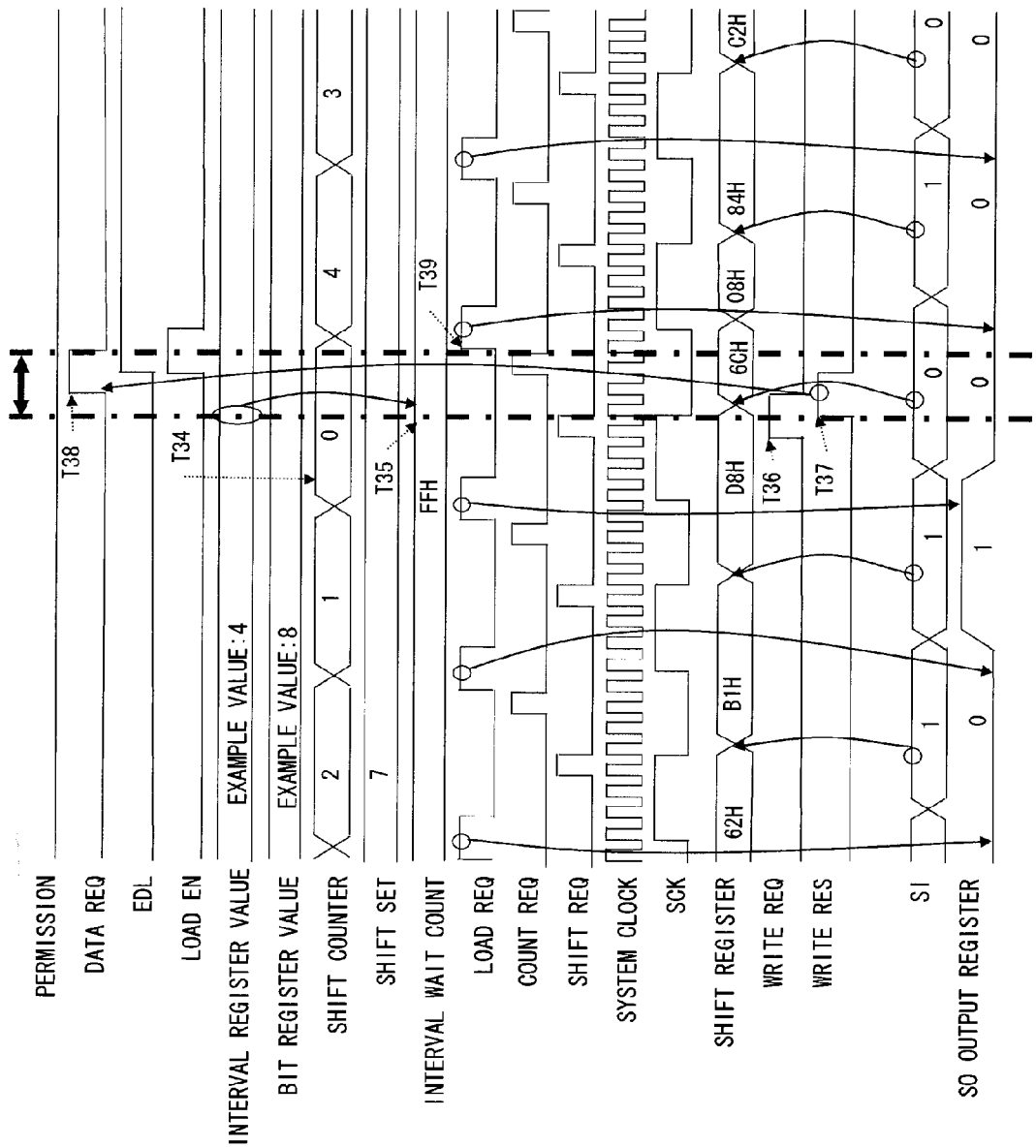
FIG. 8 is a timing chart (2/3) showing a process flow of serial transfer in the case of FIG. 6.
Figure 9:
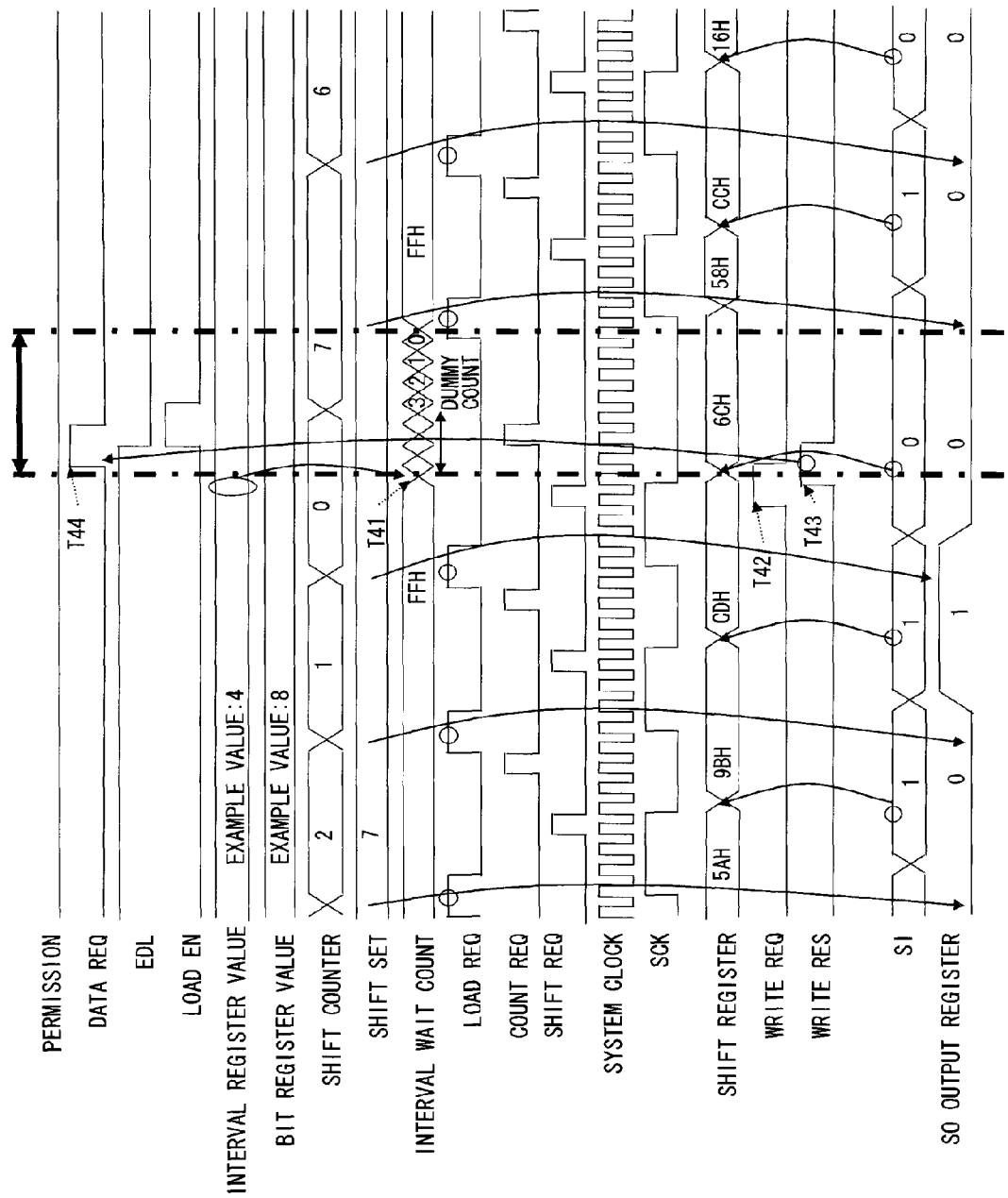
FIG. 9 is a timing chart (3/3) showing a process flow of serial transfer in the case of FIG. 6.

The operation from T21 to T24 is the same as the operation from T1 to T4 in FIG. 4, except that the EDL is invalid in FIG. 7 while the EDL is valid in FIG. 4. Because the operation of transmitting 8-bit (which is the number of bits of the shift register B12) serial data and then transmitting 5-bit serial data in succession is performed in the case of transmitting 13-bit serial data, the EDL is invalid for the first 8-bit serial data.

At T25, when the shift register B12 receives the load EN signal from the FIFO control unit B5, the shift register B12 loads and sets the transmission data from the data area B51. Because the EDL is invalid at the timing of T25 in FIG. 7, the transmission data with the bit width of the shift register B12 is stored in the data area B51. In the example of FIG. 7, "47H" is set as 8-bit serial data to the shift register B12.

The operation at T26 is the same as the operation at T6 in FIG. 4.

At T27, when the transfer control unit B14 receives the load EN from the FIFO control unit B5, the transfer control unit B14 sends out the transmission output FF load request. Further, the transfer control unit B14 starts the count operation of the shift counter based on the information initially set to the bit length setting register B2. Because the EDL is invalid at the timing of T27 in FIG. 7, the transfer control unit B14 sets the number of bits of the shift register B12 to the shift counter and performs the count operation (count down in this case).

The operation from T28 to T33 is the same as the operation from T8 to T13 in FIG. 4.

Then, the operation from T27 to T33 is repeated for a predetermined number of bits (T34). The predetermined number of bits is the same as in FIG. 4. Because the EDL is invalid at the timing of T34 in FIG. 7, it is the number of bits (shift register length) of the shift register B12. By repeating the operation from T27 to T33 for the predetermined number of bits, the transmission data with the predetermined number of bits is output from the SO output register B13 to the SO, and the reception data with the same number of bits as the transmission data is stored from the SI to the shift register B12. When the count value of the shift counter reaches zero, the transfer control unit B14 detects that the transmission data with the predetermined number of bits has been transmitted and the reception data has been received.

At T35, when the count value of the shift counter reaches zero, the transfer control unit B14 does not start the serial transfer interval waiting count operation because the EDL is invalid. Further, at this timing, the transfer control unit B14 sends out the shift end request to the CLK control unit B11. Because the transfer control unit B14 does not perform the serial transfer interval waiting count operation, it sends out the transmission FF load request until starting the transfer of the next serial data without counting the transfer interval after receiving the load EN from the FIFO control unit B5 (T39, which is described later).

At T36, when the CLK control unit B11 receives the shift end request from the transfer control unit B14, the CLK control unit B11 sends out the reception FIFO write request to the FIFO control unit B5.

At T37, if the FIFO buffer B53 is not in a full state but in a data receivable state, the FIFO control unit B5 sends out the reception FIFO write response to the transmission data request control unit B15. At this time, the reception FIFO write request is adjusted to wait for timing in such a way that the reception FIFO write timing is after the timing of the falling edge of the serial clock SCK in consideration of the specification about loading of data to the shift register B12.

At T38, when the transmission data request control unit B15 receives the reception FIFO write response from the FIFO control unit B5, the transmission data request control unit B15 enables the transmission data request signal to the FIFO control unit B5. This enables repetition of the operation after T1. In the period surrounded by the dash-dotted line in FIG. 8, the operation of making transition from the first transfer unit to the next transfer unit in one frame is performed. Because the EDL is invalid at this time, the transfer control unit B14 does not perform the serial transfer interval waiting count operation.

At T39, because the transfer control unit B14 does not perform the serial transfer interval waiting count in the transfer of the next data corresponding to the size of the shift register, it is regarded as having ended. When the FIFO control unit B5 enables the first load EN, the transfer control unit B14 makes the transmission FF load request for the next data corresponding to the size of the shift register.

After T40, the serial transfer of the next data corresponding to the size of the shift register is continuously executed.

At T41, when the reception of data with the predetermined number of bits (which is 5 bits in this case) ends, if the EDL is valid, the serial transfer interval waiting count operation is started. At the timing of T41 in FIG. 7, the EDL is valid because it is at the stage when the serial transfer of one frame of 13-bit serial data including the end word has ended. The transfer control unit B14 performs the transfer interval waiting count based on the interval information set to the transfer interval setting register B3.

At T42, when the CLK control unit B11 receives the shift end request from the transfer control unit B14, the CLK control unit B11 sends out the reception FIFO write request to the FIFO control unit B5.

At T43, if the FIFO buffer B53 is not in a full state but in a data receivable state, the FIFO control unit B5 sends out the reception FIFO write response to the transmission data request control unit B15. At this time, the reception FIFO write request is adjusted to wait for timing in such a way that the reception FIFO write timing is after the timing of the falling edge of the serial clock SCK in consideration of the specification about loading of data to the shift register B12.

At T44, when the transmission data request control unit B15 receives the reception FIFO write response from the FIFO control unit B5, the transmission data request control unit B15 enables the transmission data request signal to the FIFO control unit B5. This enables repetition of the operation after T21. In the period surrounded by the dash-dotted line in FIG. 9, the operation of making transition from the first transfer unit to the next transfer unit in one frame is performed. Because the EDL is valid at this time, the transfer control unit B14 performs the serial transfer interval waiting count operation. After that, the serial transfer of the next frame is continuously executed.

The operation of serial transfer described above with reference to FIGS. 3 to 9 is based on the assumption that the serial control device inputs reception data in synchronization with output of transmission data. Therefore, reference to the EDL is made when transmitting the transmission data, and reception data with the same number of bits as the transmitted transmission data is received.

As described above, the serial control device according to the exemplary embodiment includes the FIFO control unit B5 that contains EDL indicating the boundary between frames of serial data and controls the serial transfer by using the EDL. Specifically, the serial data is sent out in succession when the EDL is invalid, and only the transmission data with the length specified by the bit length setting register is enabled when the EDL is valid. In this manner, control can be made by varying the frame length in units of bits with a small shift register. Further, transfer of the next frame of serial data can be performed after the lapse of an arbitrary period from transfer of one frame of serial data. At this time, because the end data can be detected with use of the EDL, when transferring the same transfer unit repeatedly in one frame of serial data, the data can be transferred in succession. This allows the CPU to transmit and receive an arbitrary length of serial data as one frame of serial data.

Further, the serial control device according to the exemplary embodiment can be constructed by using a single serial control device that includes a serial transfer unit having a shift register and other control parts, a FIFO control unit or the like. This enables transfer of serial data with an arbitrary length. This eliminates the need for a plurality of serial control devices, which have been required in related art.

Further, when performing serial transfer of serial data with a long frame length, by exchanging data between FIFO and a serial transfer device, consecutive transfer of a long frame can be performed. Thus, even when performing serial transfer of serial data with a short frame length, by accumulating data in FIFO, the interrupt period can be extended. It is thus possible to overcome the problem of related art that there is a circuit that is not used at all when the frame bit length is short.

[Second Exemplary Embodiment]

In a second exemplary embodiment of the present invention, an example of a serial control device that has an adjustment function when performing serial communication with a plurality of slave devices is described.

Figure 10:
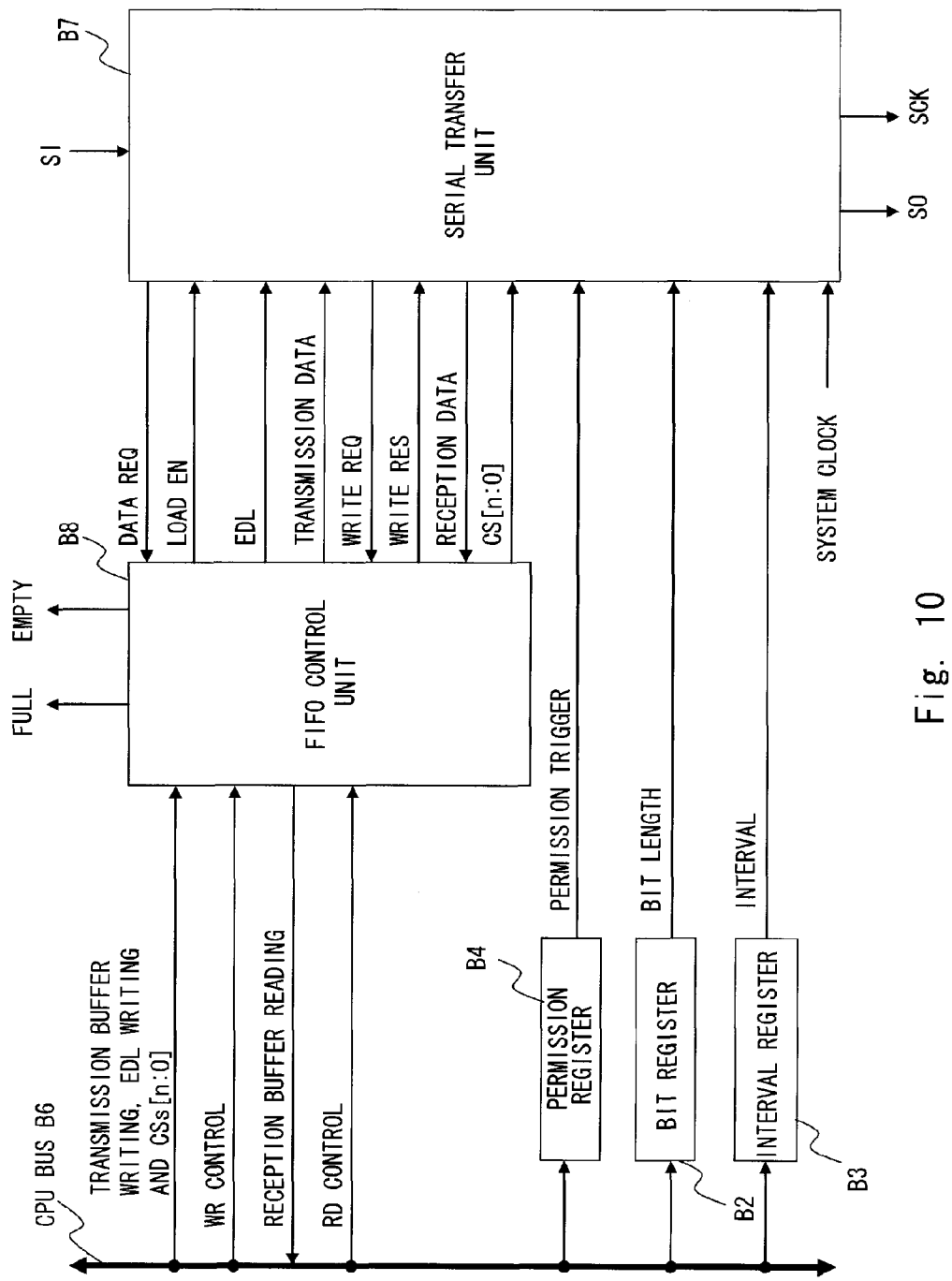
FIG. 10 is a block diagram showing an example of a configuration of a serial control device according to a second exemplary embodiment of the present invention.

FIG. 10 shows an example of a configuration of a serial control device according to the second exemplary embodiment. A FIFO control unit B8 performs storing of a plurality of chip select signals (CSs) [n:0], where n is an integer of 0 or greater, in addition to writing to a transmission buffer and writing of EDL. The chip select signal CS has (n+1) number of bits. The serial control device can be connected to the (n+1) number of devices at maximum. The chip select signal CS is also called device information because it is information related to a device connected to the serial control device.

A serial transfer unit B7 refers to the CS written to the FIFO control unit B8 and controls the serial communication.

For example, the CPU inputs a plurality of chip select signals CSs to the FIFO control unit B8 through the CPU bus B6. The CPU specifies a device to which transmission data written to the transmission buffer is transferred by enabling each bit of the chip select signals CSs [n:0] (H). The CPU enables the chip select signals CSs when transmitting the same transmission data to a plurality of devices connected to the serial control device. The serial control device serially transmits the same transmission data to the devices with the enabled CS. In this manner, the serial control device can serially transmit the same transmission data to a plurality of devices by one-time writing to the FIFO control unit B8 from the CPU.

Figure 11:
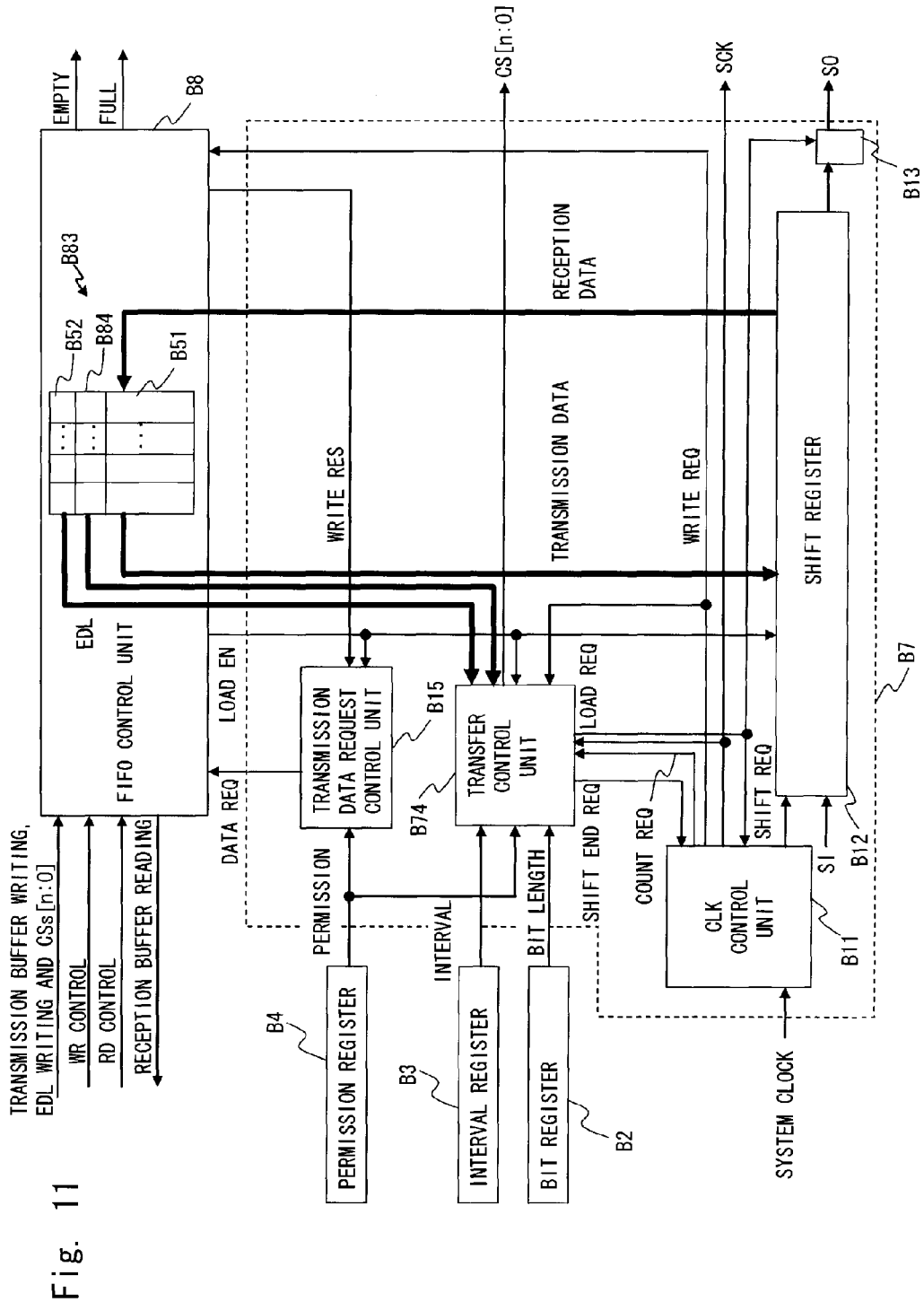
FIG. 11 is a block diagram showing an example of a configuration of a serial transfer unit and a FIFO control unit according to the second exemplary embodiment.

FIG. 11 shows an example of a configuration of the serial transfer unit B7 and the FIFO control unit B8 according to the second exemplary embodiment.

The FIFO control unit B8 includes a FIFO buffer B83 that includes a CS[n:0] B84 in addition to a data area B51 and an EDLB 52.

A transfer control unit B74 receives the chip select signal CS[n:0] from the FIFO control unit B8 and controls a transmission destination of transmission data by using the chip select signal CS[n:0]. Further, the transfer control unit B74 receives the serial clock SCK from the CLK control unit B11 and controls transfer of the transmission data.

Hereinafter, an operation according to the second exemplary embodiment is described mainly about a point different from that of the first exemplary embodiment. The FIFO control unit B8 sends out the chip select signal CS[n:0] to the transfer control unit B74 at the timing of sending out the load EN.

In serial communication of one frame, the transfer control unit B74 enables an external terminal that outputs transmission data from the SO output register B13 based on the chip select signal CS[n:0] at the first SCK timing (at the start of one frame). Further, the transfer control unit B74 disables the external terminal based on the chip select signal CS[n:0] in synchronization with the serial clock SCK at the reception FIFO write request timing indicating the end of one frame.

The other operation is the same as that of first exemplary embodiment.

In this exemplary embodiment, the serial control device outputs the chip select signal CS[n:0] according to a plurality of communication devices at the receiving end, and it is thus possible to vary the frame length of serial communication according to a plurality of communication devices at the receiving end.

As described above, according to the exemplary embodiments described above, by using the FIFO control units B5 and B8, it is possible to flexibly conform to the data length of one frame in a device at the destination of serial communication. Further, by repeatedly using the shift register and enabling serial communication of data with the length equal to or shorter than the bit length of the shift register, it is possible to make effective use of the serial control device. It is thus possible to conform to the data length of one frame at the destination of serial communication without adding hardware such as a shift register.

For example, even when serial devices are cascaded as disclosed in the patent document 1 or MPC5553/5554 Microcontroller Reference Manual, the frame length of one serial device or the number of serial devices incorporated into one microcomputer are fixed. On the other hand, in the exemplary embodiments described above, it is possible to significantly increase the number of slave devices and the transfer data length by performing control with use of the FIFO control unit B5.

Further, in the configuration disclosed in the patent document 1 or MPC5553/5554 Microcontroller Reference Manual, the flame length of a slave device is estimated at the initial phase of design and implemented by hardware. Therefore, only the frame length within the estimated range at the initial phase of design can be supported. However, in the serial control device according to the exemplary embodiment of the present invention, when the frame length of serial data which is longer than the estimated length at the initial design is necessary, serial transfer is possible with use of the FIFO structure, despite that the number of frames accumulated in the FIFO control unit is reduced. Because the interrupt period can be reserved unless the frequency with respect to bits of serial transfer becomes higher, the set time of the next frame can be reserved in spite of a decrease in the number of frames accumulated in the FIFO control unit.

Figure 12:
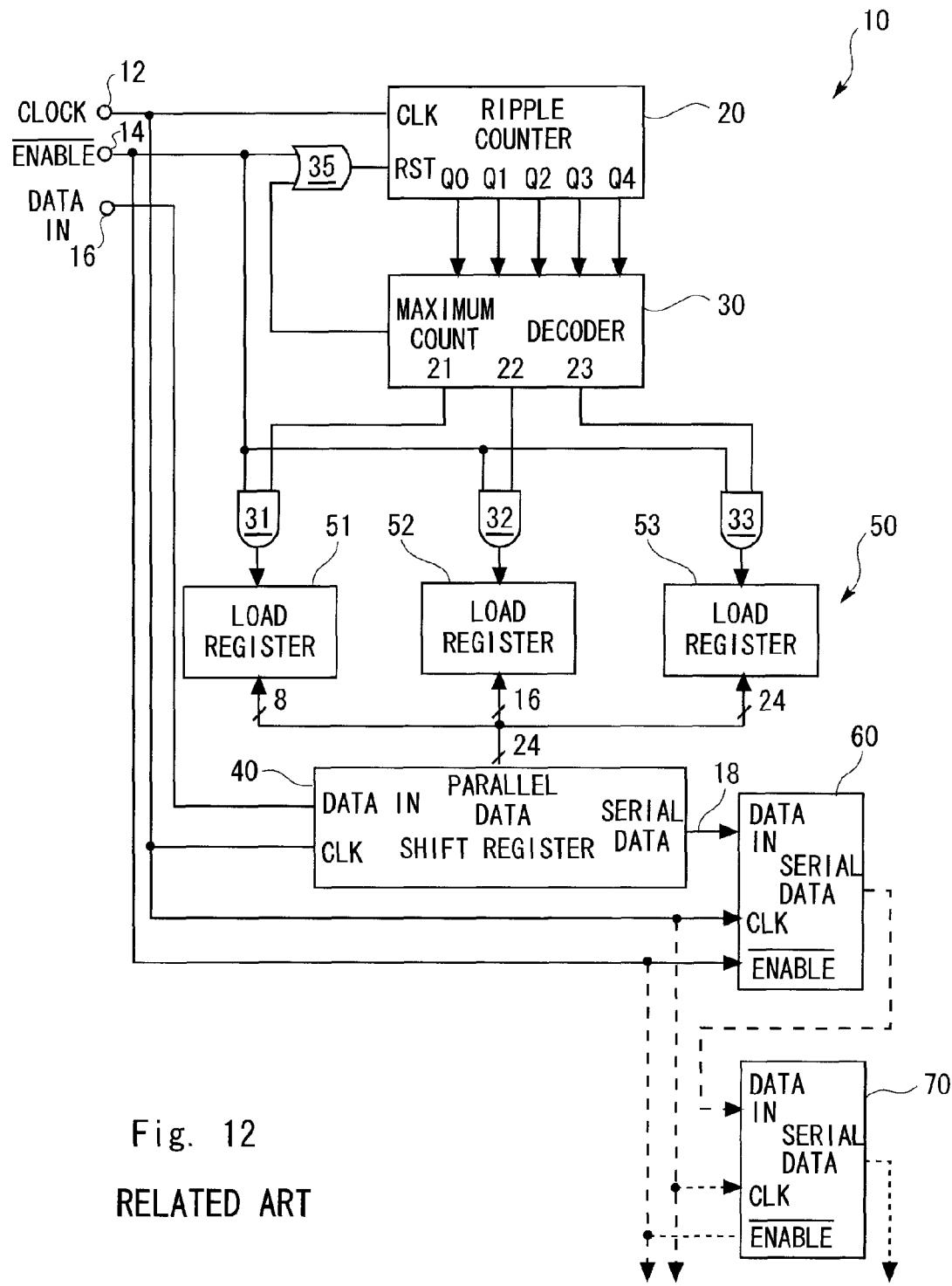
FIG. 12 is a view showing a configuration of a serial control device according to related art.
Figure 13:
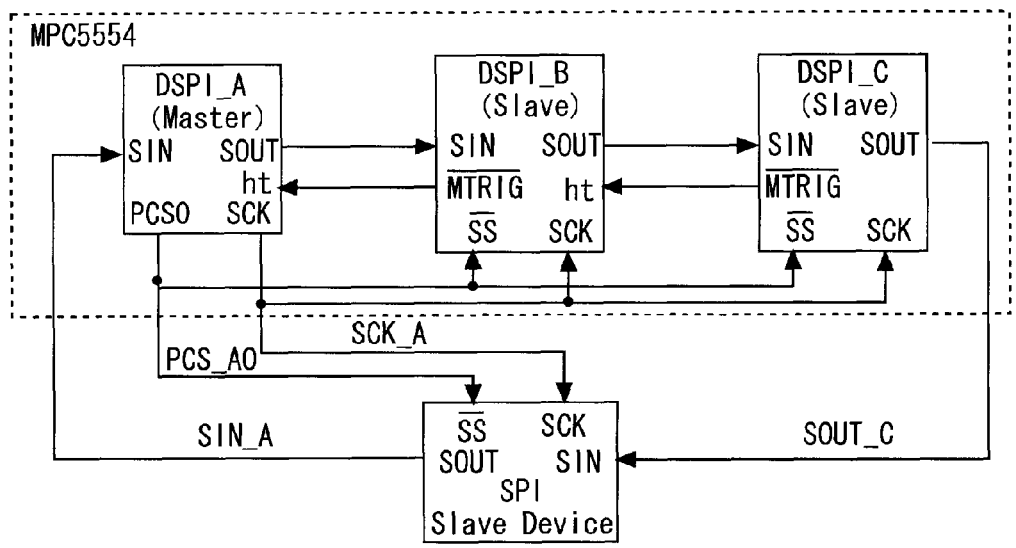
FIG. 13 is a view showing another configuration of a serial control device according to related art.
Figure 14:
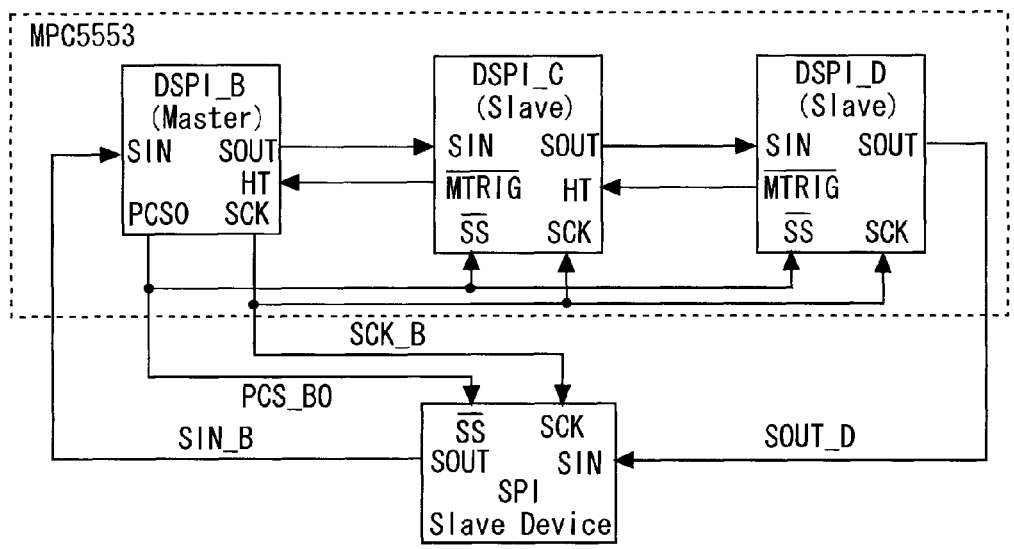
FIG. 14 is a view showing yet another configuration of a serial control device according to related art.

Further, in the patent document 1, a plurality of shift registers are included because a plurality of peripheral devices 60 and 70 are connected as shown in FIG. 12. Therefore, the bit length of the shift register is physically long in the device as a whole. Further, because a plurality of independent peripheral devices 10, 60 and 70 are included, many control circuits are not effectively used.

In the serial control device according to the exemplary embodiment of the present invention, it is possible to store an arbitrary length of serial data by using the function of the FIFO control unit and repeatedly transferring the transfer unit with a desired length (e.g. the bit width of the shift register). This eliminates the need to store serial data in a plurality of shift registers, for example, thereby enabling effective use of hardware resources.

Further, a plurality of serial control devices are necessary also in MPC5553/5554 Microcontroller Reference Manual, as in the patent document 1. However, according to the exemplary embodiment of the present invention, it is possible to transfer serial data with an arbitrary length of frame by using a single serial control device.

As described above, the serial control device according to the exemplary embodiment of the present invention enables transfer of serial data with an arbitrary length by using fewer hardware compared to related art. This enables effective use of hardware resources such as a terminal included in a semiconductor device. This also enables cost reduction.

As described above, in the serial control device according to the exemplary embodiment of the present invention, it is possible to extend the transfer length of one frame to a free length and make selection from 1 bit to infinite bits with respect to each frame according to a communication target device or the like during communication.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A serial control device that transfers serial data having an arbitrary length, comprising;
   a register that stores a value corresponding to a length of the serial data;
   a storing unit that includes a plurality of data areas, each of the plurality of the data areas storing a divided serial data having a length equal to or shorter than a transfer unit length;
   a shift register that loads the divided serial data from each of the plurality of the data areas in order; and
   a control unit that, when the divided serial data is loaded from each of the plurality of the data areas to the shift register, counts a length of the loaded data,
   wherein the control unit shifts the divided serial data stored in the shift register by one of the transfer unit length and a length shorter than the transfer unit length based on the count value and the value of the register.

2. The serial control device according to claim 1, wherein the control unit shifts the value stored in the shift register by the transfer unit length or a remainder (natural number) of dividing the arbitrary length by the transfer unit length.

3. The serial control device according to claim 1, wherein the storing unit includes a plurality of first areas and a plurality of second areas, each of the plurality of second areas corresponding to a respective one of the plurality of first areas,
   each of the plurality of first areas stores a divided serial data, the divided serial data being obtained by dividing the serial data so that each divided serial data has the transfer unit length,
   each of the plurality of second areas stores a value indicating whether or not there is any data that follows the divided serial data stored in a corresponding first area within the serial data, and
   the control unit counts a length of data loaded from the first area corresponding to the second area into the shift register based on a value stored in the second area.

4. The serial control device according to claim 3, wherein the control unit comprises:
   a transfer control unit that loads a value stored in the second area in response to storage of the serial data into the storing unit, counts a length of data loaded from the first area corresponding to the second area into the shift register, refers to the count value and the value of the register, and thereby generates a load request indicating one of the transfer unit length and a length shorter than the transfer unit length; and
   a clock control unit that generates a shift request in synchronization with a system clock based on the load request,
   the shift register loads the divided serial data from one of the plurality of first areas in response to storage of the serial data into the storing unit, and
   the shift register shifts the divided serial data stored therein in response to the shift request.

5. The serial control device according to claim 3, wherein the value stored in the second area is last information indicating whether last data of the serial data is included or not, and
   the control unit shifts a value stored ill the shift register by the transfer unit length or a length shorter than the transfer unit length based on the last information stored in the second area.

6. The serial control device according to claim 5, wherein the register stores a value indicating a length of last divided serial data among the divided serial data obtained by dividing the serial data so that each divided serial data has the transfer unit length, and the control unit shifts a value stored in the shift register according to the value of the register when the last information stored in the second area indicates that last data of the serial data is included.

7. The serial control device according to claim 5, wherein for the last information, a last part of serial data included in one frame is determined as last data.

8. The serial control device according to claim 3, further comprising a transfer interval setting register that stores a value indication an arbitrary period, wherein the control unit starts transferring next serial data after the arbitrary period indicated by the value of the transfer interval setting register has elapsed when a value stored in the second area indicates that there is no data that follows the divided serial data stored in the corresponding first area.

9. A semiconductor device comprising a serial conductor device that transfers serial data having an arbitrary length, wherein the serial conductor device comprises:

a register that stores a value corresponding to a length of the serial data;

a storing unit that includes a plurality of data areas, each of the plurality of the data areas storing a divided serial data having a length equal to or shorter than a transfer unit length;

a shift register that loads the divided serial data from each of the plurality of the data areas in order; and a control unit that, when the divided serial data is loaded from each of the plurality of the data areas to the shift register, counts a length of the loaded data, wherein the control unit shifts the divided serial data stored in the shift register by one of the transfer unit length and a length shorter than the transfer unit length based on the count value and the value of the register.

* * * * *